United States Patent
Vorobyev

(10) Patent No.: US 8,688,858 B2
(45) Date of Patent: Apr. 1, 2014

(54) IMAGE PROCESSING DEVICE, DEVICE MANAGEMENT SYSTEM, AND IMAGE PROCESSING METHOD

(75) Inventor: Konstantin Vorobyev, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 392 days.

(21) Appl. No.: 13/044,638

(22) Filed: Mar. 10, 2011

(65) Prior Publication Data
US 2011/0225321 A1    Sep. 15, 2011

(30) Foreign Application Priority Data

Mar. 15, 2010    (JP) .................................. 2010-057167

(51) Int. Cl.
*G06F 15/16*    (2006.01)
(52) U.S. Cl.
USPC ............ 709/246; 709/201; 709/202; 709/230
(58) Field of Classification Search
USPC ................... 709/246, 201, 202, 230
See application file for complete search history.

(56) References Cited

U.S. PATENT DOCUMENTS

2004/0181529 A1*  9/2004 Hiltgen et al. ............... 707/9
2007/0226232 A1*  9/2007 Yin et al. ..................... 707/100

FOREIGN PATENT DOCUMENTS

JP    2003-032652    1/2003

* cited by examiner

*Primary Examiner* — Lan-Dai T Truong
(74) *Attorney, Agent, or Firm* — IPUSA, PLLC

(57) ABSTRACT

An image processing device is connected to a device management apparatus via a network and includes device information in accordance with the Common Information Model CIM. In the image processing device, a first transform part transforms, when a query described in a general-purpose language to include a request of data handling of device information with respect to jobs is received, CIM objects, generated from the device information with respect to the jobs, into XML data items. A combining part combines the XML data items into XML data and generates the combined XML data. An extracting part extracts an XML data item associated with the request from the combined XML data. A second transform part transforms the XML data item into a CIM object. The data handling of the CIM object is performed and a result of the data handling is transmitted.

4 Claims, 10 Drawing Sheets

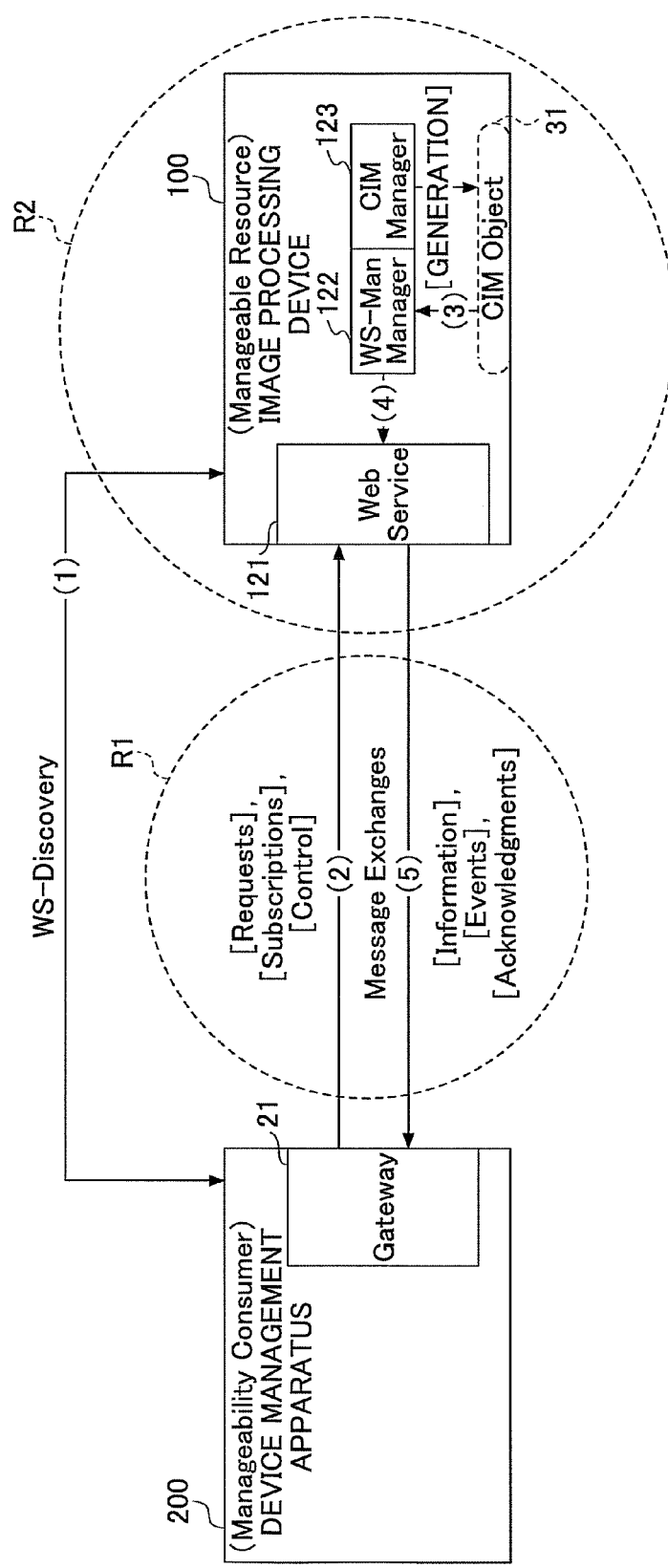

IMAGE PROCESSING DEVICE, DEVICE MANAGEMENT SYSTEM, AND IMAGE PROCESSING METHOD

BACKGROUND OF THE INVENTION

1. Field of the Invention

The present disclosure generally relates to a device management system in which a device management apparatus and one or more image processing devices are connected via a network and the image processing devices are managed by the device management apparatus, and more particularly to a technology of managing jobs of image processing devices each having device information in accordance with the Common Information Model (CIM).

2. Description of the Related Art

Conventionally, a device management system which monitors the states of image processing devices, such as MFP (multi-function peripherals) or printers, which are connected via a network, such as a LAN, by using a device management apparatus (or a device management server) is known. By making use of the device management apparatus, a problem in each image processing device can be detected remotely with no necessity for a user to go to the image processing device.

In the device management system according to the related art, a device management service (or a device management function) is provided by the device management apparatus as follows. For example, the device management apparatus periodically collects device information from each image processing device using a predetermined communication protocol. The collected device information is stored in a memory unit provided in the device management apparatus. For example, the device information collected from each image processing device includes an execution state (a service provision state) of each of various software parts provided in the image processing device, an operating state of each of various hardware parts provided in the image processing device, and an execution state of a job including requested specifications. The device management apparatus detects a change of the state of each image processing device based on the stored device information, and performs notification to the administrator and remote control of the image processing devices in accordance with a predetermined device management policy.

In recent years, the managed devices, such as the image processing devices, are arranged to store device information in accordance with the CIM (Common Information Model) which is an object-oriented standardized data model. It is to be noted that the CIM is advantageous over the MIB (Management Information Base) in that addition or modification of information can be easily performed with the CIM, expandability of the CIM is excellent, and extension to cooperative businesses is enabled by the use of the data model of the industry standard.

The device information in accordance with the CIM is managed as CIM objects which are generated from instances of CIM classes. For example, U.S. Patent Application Publication No. 2007/0226232 discloses a system and method for managing CIM objects. In the system, data access requests to CIM objects and their CIM responses are transmitted between the CIM clients and the CIM object manager (CIMOM). An image processing device with the technology incorporated therein will be able to manage the device information in accordance with the CIM and supply the device information to a device management apparatus in response to a request from the device management apparatus.

However, in the case of the system and method disclosed in U.S. Patent Application Publication No. 2007/0226232, it is necessary to prepare an extension to the CIMOM depending on the content of a data handling request with respect to the device information. For example, it is conceivable that the running of execution jobs on an image processing device is remotely managed by a device management apparatus in a device management system according to the related art. In this case, for the purpose of job management, it is necessary for the device management apparatus to acquire the information with respect to the execution jobs as the managed objects from the image processing device. Hence, in response to an information acquisition request from the device management apparatus, the image processing device has to search and discover an execution job that meets the requested condition among the execution jobs, and has to transmit the information with respect to the discovered execution job to the device management apparatus as the device information.

However, as described above, the information with respect to the execution jobs is managed as CIM objects and there are only classes and instances in the memory area. When a plurality of execution jobs exist, a plurality of CIM objects are generated corresponding to the plurality of execution jobs. Hence, according to the related art, an extension to the CIMOM which controls the transmission of CIM requests and CIM responses has to be prepared to include a job extract function to search and discover an execution job that meets a requested condition. The task for preparing the extension to the CIMOM requires advanced technology with complicated work, which will not be desired by the developer.

Moreover, if the extension to the CIMOM is prepared to include the job extract function, the device management apparatus has to send a request for acquisition of the information with respect to the job to an image processing device by using a predefined command in conformity with the extended specifications. Hence, it has been difficult for the device management apparatus to carry out data handling of the device information by transmitting a query (data handling command) described in a general-purpose language, to the image processing device.

Therefore, according to the related art, the extension to the CIMOM has to be prepared, and it has been difficult to carry out the job management using the device information in accordance with the CIM, by execution of a query described in a general-purpose language.

SUMMARY OF THE INVENTION

In one aspect, the present disclosure provides an image processing device, a device management system, and an image processing method which can perform job management using device information in accordance with the CIM by execution of a query described in a general-purpose language, without having to prepare the extension to the CIMOM.

In an embodiment which solves or reduces one or more of the above-described problems, the present disclosure provides an image processing device which is connected to a device management apparatus via a network, the device management apparatus managing the image processing device based on device information received from the image processing device and described in accordance with the Common Information Model CIM, the image processing device including a processing unit including: a first transform part to transform, when a query described in a general-purpose language to include a request of data handling of device information with respect to jobs is received from a requesting source, CIM objects, generated on a memory unit from the device information with respect to the jobs, into XML data items respectively; a combining part to combine the XML data items from the transform part into XML data and generate the combined XML data on the memory unit; an extracting part to extract at least one XML data item associated with the data handling request from the combined XML data from the combining part; and a second transform part to transform the XML data item from the extracting part into at least one CIM object, wherein the image processing device performs the data handling of the at least one CIM object and transmits a result of the data handling to the requesting source.

In an embodiment which solves or reduces one or more of the above-described problems, the present disclosure provides a device management system in which a device management apparatus and one or a plurality of image processing devices are connected via a network, the device management apparatus managing each image processing device in a unified manner based on device information received from the image processing device and described in accordance with the Common Information Model CIM, each image processing device including a processing unit including: a first transform part to transform, when a query described in a general-purpose language to include a request of data handling of device information with respect to jobs is received from the device management apparatus, CIM objects, generated on a memory unit from the device information with respect to the jobs, into XML data items respectively; a combining part to combine the XML data items from the transform part into XML data and generate the combined XML data on the memory unit; an extracting part to extract at least one XML data item associated with the data handling request from the combined XML data from the combining part; and a second transform part to transform the XML data item from the extracting part into at least one CIM object, wherein the image processing device performs the data handling of the at least one CIM object and transmits a result of the data handling to the device management apparatus.

In an embodiment which solves or reduces one or more of the above-described problems, the present disclosure provides an image processing method for use in an image processing device which is connected to a device management apparatus via a network, the device management apparatus managing the image processing device based on device information received from the image processing device and described in accordance with the Common Information Model CIM, the image processing device including a processing unit, the image processing method including: transforming, by a first transform part of the processing unit, when a query described in a general-purpose language to include a request of data handling of device information with respect to jobs is received from a requesting source, CIM objects, generated on a memory unit from the device information with respect to the jobs, into XML data items respectively; combining, by a combining part of the processing unit, the XML data items from the transform part into XML data to generate the combined XML data on the memory unit; extracting, by an extracting part of the processing unit, at least one XML data item associated with the data handling request from the combined XML data from the combining part; and transforming, by a second transform part of the processing unit, the XML data item from the extracting part into at least one CIM object, wherein the image processing device performs the data handling of the at least one CIM object and transmits a result of the data handling to the requesting source.

Other objects, features and advantages of the present disclosure will become more apparent from the following detailed description when read in conjunction with the accompanying drawings.

BRIEF DESCRIPTION OF THE DRAWINGS

FIG. 4 is a diagram for explaining a message exchange operation by a WS-Management of the image processing device of the present embodiment.

DETAILED DESCRIPTION OF THE PREFERRED EMBODIMENTS

A description will be given of embodiments of the present disclosure with reference to the accompanying drawings.

Figure 1:
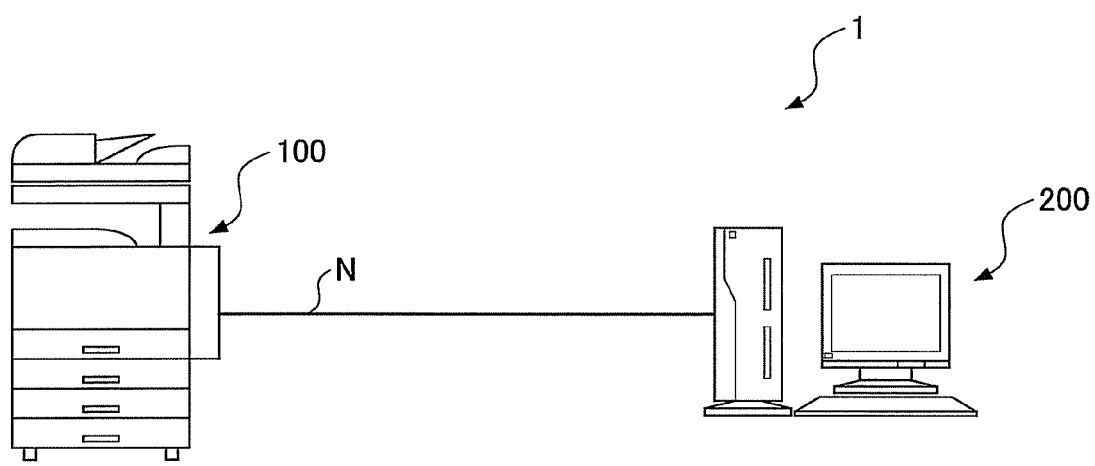
FIG. 1 is a diagram showing the composition of a device management system of one embodiment of the present disclosure.

FIG. 1 is a diagram showing the composition of a device management system 1 of one embodiment of the present embodiment.

As shown in FIG. 1, the device management system 1 includes an image processing device 100 and a device management apparatus (device management server) 200 which are connected via a network N (for example, a LAN).

The image processing device 100 is, for example, a network device which has an image processing function, such as an MFP (multi-function peripheral) or a LP (laser printer), which is used in an office environment. The device management apparatus 200 is, for example, an information processing device which manages the image processing device 100 in a unified manner based on the device information (including device-specific information, status information, execution job information, etc. of the device 100) received from the image processing device 100. This unified management includes monitoring, maintenance, etc. of the image processing device 100.

In the device management system 1, a variety of information items required for the device management is transmitted between the device 100 and the device management apparatus 200 in a bi-directional manner by using a predetermined communication protocol, such as the SOAP (simple object access protocol).

When a client PC (personal computer) is connected to the device management system 1 via the network N, the device management apparatus 200 transmits the device information of a corresponding device 100 to the client PC in response to a request from the client PC, and supplies a user on the client PC with the device-specific information and status information of the image processing device 100. Accordingly, the device management system 1 can provide a device management service (a device management function) to the user by the above-described composition.

Next, the hardware composition of an image processing unit 100 of one embodiment of the present disclosure will be described.

Because the device management apparatus 200 is an information processing device, such as a PC, a description of the hardware composition of the device management apparatus 200 will be omitted.

Figure 2:
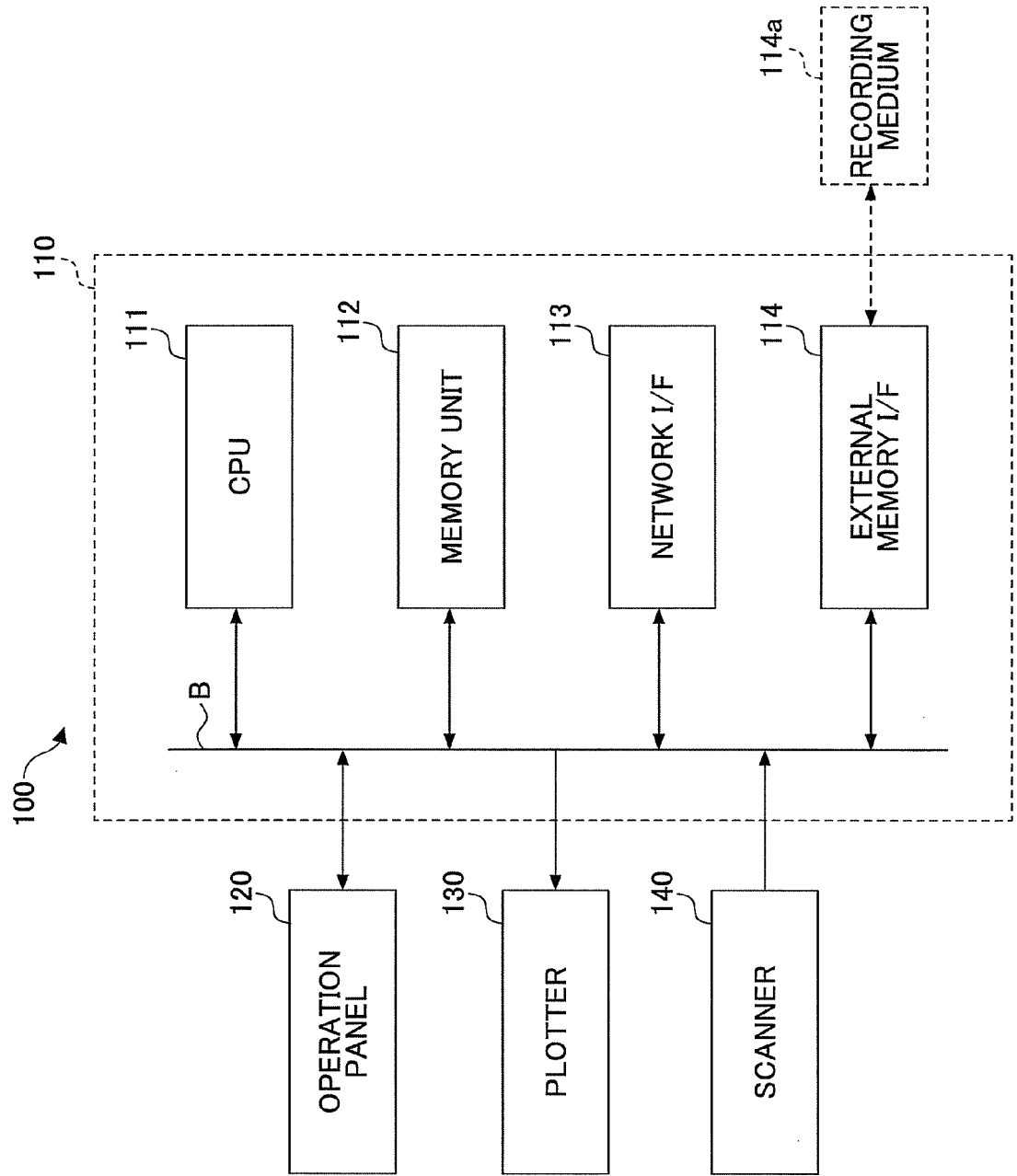
FIG. 2 is a diagram showing the hardware composition of an image processing device of one embodiment of the present disclosure.

FIG. 2 is a diagram showing the hardware composition of the image processing device 100 of the present embodiment.

As shown in FIG. 2, the image processing device 100 includes a controller 110, an operation panel 120, a plotter 130, and a scanner 140, which are interconnected by a bus B.

The operation panel 120 is provided with a display unit and an input unit. The operation panel 120 supplies a user with a variety of information items, such as the device information, displayed on the display unit, and receives various manipulating operations, such as operational setting or operational instructions, input by a user from the input unit. The plotter 130 is provided with an image formation part, and forms a print output image on a recording sheet. The formation of a print output image is performed by using, for example, an electrophotographic printing method, an inkjet printing method, etc. The scanner 140 optically reads a document and generates image data of the read image.

The controller 110 includes a CPU (central processing unit) 111, a memory unit 112, a network interface (I/F) 113, and an external memory I/F 114, which are interconnected by the bus B.

The CPU 111 controls the whole image processing device 10 by executing a program. The memory unit 112 stores and holds the program and various data (for example, "image data"). Examples of the memory unit 112 may include a RAM (random access memory), a ROM (read only memory), a HDD (hard disk drive), etc. The RAM functions as a work area of the CPU 111 in which the temporarily read program and data are stored in a storage area. The ROM or the HDD is used as the storage unit in which the program and data are stored. In the image processing device 100, the CPU 111 reads the program from the ROM and loads the program to the RAM, so that the CPU 111 executes the program on the RAM.

The network I/F 113 is an interface for connecting the image processing device 100 to the network N, such as a LAN. The external memory I/F 114 is an interface for connecting a recording medium 114a as an external memory unit to the image processing device 100. Examples of the recording medium 114a may include an SD (secure digital) memory card, a USB (universal serial bus) memory, etc. In the image processing device 100, the program and data which are stored in the recording medium 114a are read through the external memory I/F 114.

Accordingly, the image processing device 100 can provide an image-processing service (or an image processing function) by the above-described composition.

Figure 3:
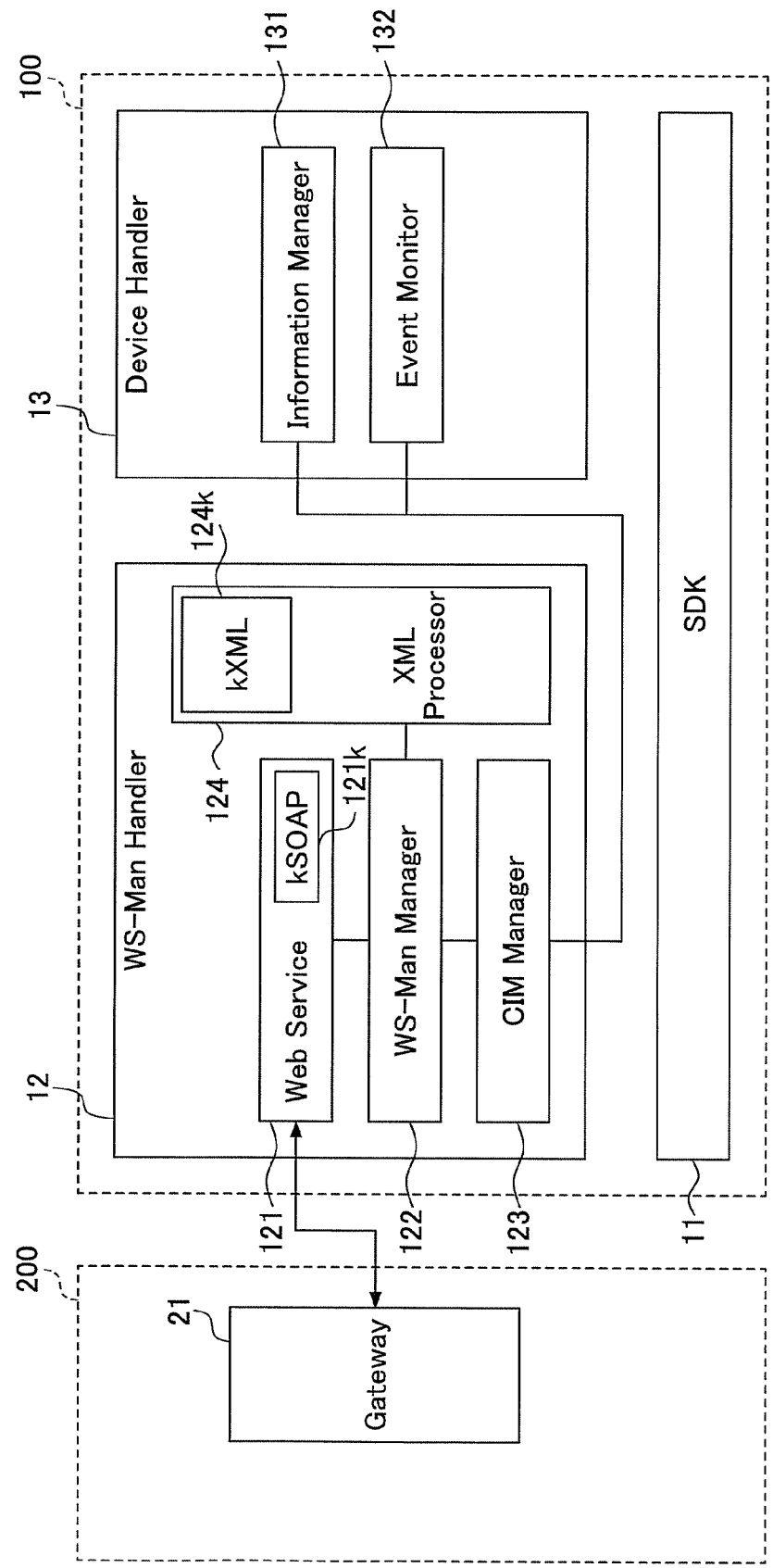
FIG. 3 is a diagram showing the software composition of the image processing device of the present embodiment.

Next, the software composition of the image processing unit 100 will be described. FIG. 3 is a diagram showing the software composition of the image processing device 100 of the present embodiment.

As shown in FIG. 3, the image processing device 100 includes an SDK (software development kit) 11 which provides a software development environment, needed for software developments, such as application programs, which is comprised of libraries, various sample codes, tools, documents, etc. The image processing device 100 includes a WS-Man handler 12, a device handler 13, etc. which are developed by using the SDK 11.

The device handler 13 is a software part which is provided in the image processing device 100 to control collection processing of the device information. The device handler 13 includes an information manager 131 and an event monitor 132, which are software parts which control the above-described collection processing in the image processing device 100.

The information manager 131 is a software part which manages the information with respect to the hardware resources of the image processing device 100 (for example, attachment option information and network setting information), the information with respect to the software parts which perform the installed functions of the image processing device 100 (for example, application information and operation setting information), etc. Specifically, the information manager 131 manages the device-specific information of the image processing device 100.

The event monitor 132 is a software part which dynamically reports the information with respect to the operating status of the image processing device 100 (for example, supply information and failure/error information). Specifically, the event monitor 132 manages the status information of the image processing device 100. Accordingly, the image processing device 100 can supply various device information items by using the device handler 13.

The WS-Man handler 12 is a software part which controls message exchange operation with the device management apparatus 200 by using a WS-Management (Web services management). The WS-Management system has the standardized Web service specifications which provide the common unit for carrying out remote management of various network devices including the communication function. For example, communication protocols and specifications of data formats for providing by a Web service a series of management operations for allowing an administrator to access a network device, for checking the state of the device, or changing the setting of the device, are specified in the WS-Management.

In the device management system 1, by using the WS-Management, the data (message) including the device information is transmitted and received between the image processing device 100 and the device management apparatus 200 in accordance with the standardized specifications specified therein. Accordingly, the device management system 1 can supply the device management service of the Web base to the administrator.

The WS-Man handler 12 includes the following software parts and controls the above-described data exchanging processing (message exchange operation) performed by the image processing device.

A Web service 121 is a software part which is provided in the WS-Man handler 12 to supply a Web service for performing the message exchange operation with the device management apparatus 200. The Web service 121 include a kSOAP 121k. By using this kSOAP 121k, the image processing device 100 performs the message exchange operation with the device management apparatus 200 by the SOAP communication. The Web service 121 transmits and receives the data (message) including the device information through a gateway 21 of the device management apparatus 200 by performing the SOAP message exchange operation between the devices. The kSOAP 121k is one of the libraries of the Web service client for the SOAP communication.

A WS-Man manager 122 is a software part which is provided in the WS-Man handler 12 to supply various services using the WS-Management including the message exchange operation.

FIG. 4 is a diagram for explaining a message exchange operation by the WS-Management of the image processing device of the present embodiment.

For example, in a case of a message exchange operation, the WS-Man manager 122 provides a service as shown in FIG. 4. In the example of FIG. 4, the device management apparatus 200 operates as the side which uses the device information (Manageability Consumer), while the image processing device 100 operates as the side which supplies the device information (Manageable Resource). As shown in FIG. 4, the message exchange operation is performed as follows.

(1) Searching of Devices Capable of Performing Message Exchange Operation

First, the device management apparatus 200 searches a network device capable of performing a message exchange operation among the network devices on the network to which the device management apparatus 200 is connected. At this time, the device management apparatus 200 transmits a predetermined packet in conformity with the WS-discovery (Web services dynamic discovery) to the network, receives the responses from each of the network devices, and discovers one or more network devices capable of performing a message exchange operation. In this manner, the device management apparatus 200 can discover one or a plurality of image processing devices 100 which are connected to the network (device management system) in the same segment and capable of performing a message exchange operation.

(2) Receiving of Information Acquisition Request

Subsequently, the discovered image processing device 100 receives a SOAP message of an information acquisition request, sent by the device management apparatus 200, through the Web Service 121. In this example, the message sent to the image processing device 100 by the device management apparatus 200 contains the information acquisition request only. Alternatively, the message sent by the device management apparatus 200 may contain registration commands (subscriptions), operational control (control), etc.

(3) Analysis of Received Data and Acquisition of Request Information

Subsequently, the WS-Man manager 122 analyzes the received SOAP message by using the XML processor 124 (which will be described later), and checks the device information indicated by the information acquisition request.

The WS-Man manager 122 acquires the device information indicated by the information acquisition request, from the CIM objects 31 through the CIM manager 123 (which will be described later).

(4) Generation of Transmission Data

Subsequently, the WS-Man manager 122 generates a SOAP message of a response based on the acquired device information (transmission data to be returned to the requesting source) by using the XML processor 124.

(5) Sending of Response to Requesting Source

As a result, the image processing device 100 transmits the generated SOAP message to the device management apparatus 200 through the Web Service 121. In this example, the message transmitted to the device management apparatus 200 by the image processing device 100 contains the device information (information) only. Alternatively, the message transmitted to the device management apparatus 200 may contain event notifications (events) and other responses (acknowledgments).

In this manner, the image processing device 100 can provide the service with respect to the message exchange operation by using the WS-Management by controlling the steps of the control process by the WS-Man manager 122.

In the device management system 1, XML (extensible markup language) data is used for the SOAP messages transmitted between the image processing device 100 and the device management apparatus 200. Specifically, in the region R1 of the device management system 1 indicated by the dotted line in FIG. 4, the device information described as XML data (a structured document) in the SOAP messages is transmitted. On the other hand, the image processing device 100 is arranged to include the device information in accordance with the CIM. Specifically, in the region R2 of the device management system 1 indicated by the dotted line in FIG. 4, the device information from the CIM objects 31 is described in accordance with the CIM. In the device management system 1, the handling of the device information in the message exchange operation differs between the region R1 and the region R2.

Referring back to FIG. 3, the CIM manager 123 is a software part which is provided in the WS-Man handler 12 to manage the device information in accordance with the CIM. As described above, the device information included in the image processing device 100 is in accordance with the CIM and managed as the CIM objects 31. Hence, the CIM manager 123 manages the life cycle of each of the CIM objects 31 corresponding to these device information items. This life cycle means generation, modification, deletion, etc. of a CIM object. The CIM manager 123 acquires the device information of the image processing device 100 from the device handler 13 (or the device information is reported).

For example, when new device information is received from the device handler 13, the CIM manager 123 generates a corresponding CIM object 31. The generation of a CIM object is a process which generates a CIM object from an instance of a CIM class described in an object-oriented language. For example, in the generation process, declaration of an object variable (class name, object variable), generation of a new CIM object, initialization of the CIM object (constructor name (initialization value . . . )), etc. may be included.

When a change of the device information is received from the device handler 13, the CIM manager 123 performs data handling of the corresponding CIM object 31 by using the CIMOM and updates the device information.

In this manner, the CIM manager 123 manages the device information by using the CIM objects 31. Hence, the WS-Man manager 122 acquires the device information indicated by the information acquisition request, from the CIM objects 31 through the CIM manager 123.

Figures 5A, 5B:
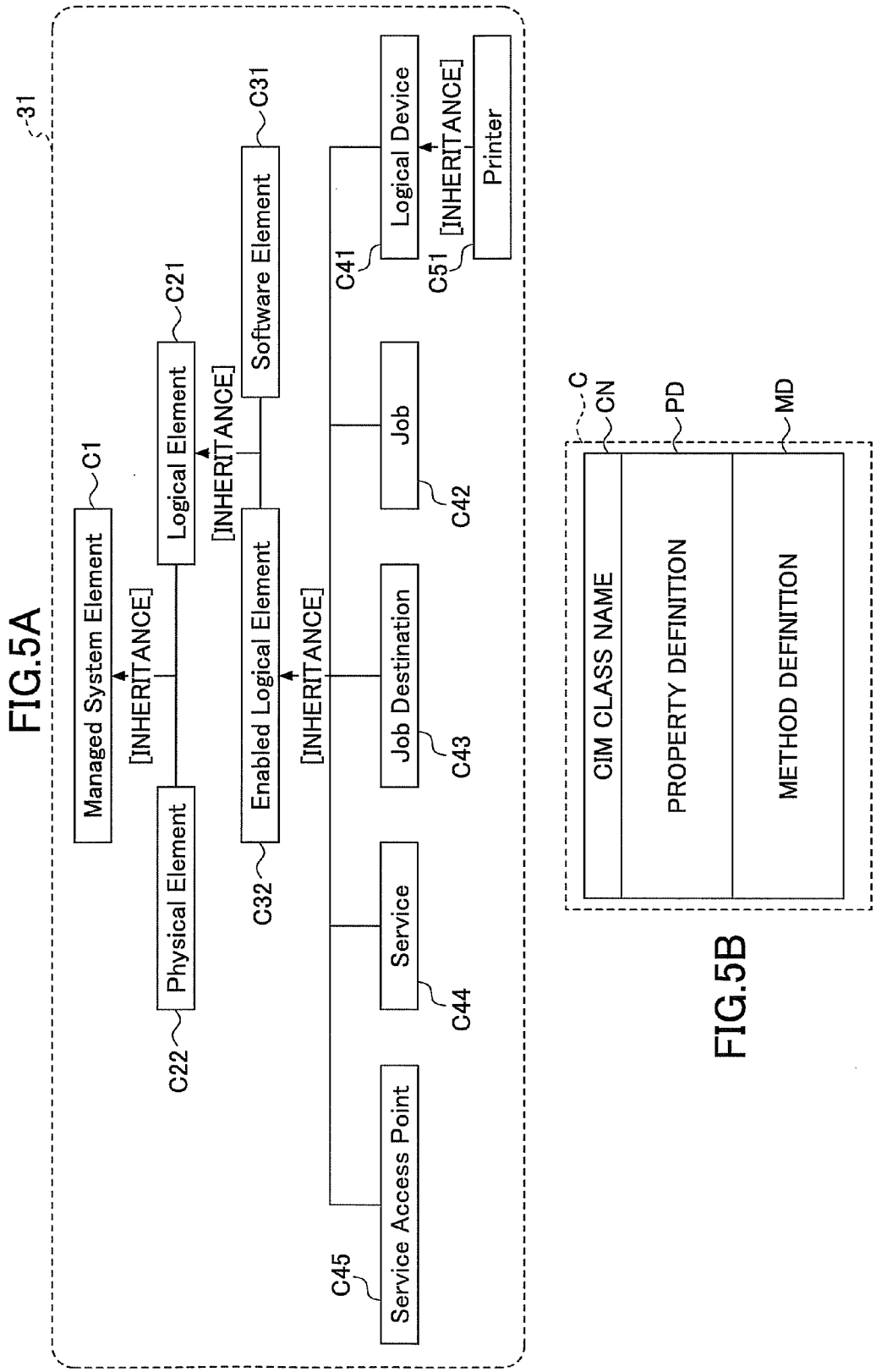
FIG. 5A and FIG. 5B are diagrams showing the composition of device information of the present embodiment in accordance with the Common Information Model CIM.

Next, the device information in accordance with the CIM which is managed by the CIM manager 123 will be described. FIG. 5A and FIG. 5B are diagrams showing the composition of the device information of the present embodiment in accordance with the Common Information Model (CIM).

For example, as shown in FIG. 5A, the CIM manager 123 manages the device information as the CIM objects 31. The CIM is an object-oriented standardized data model, and this CIM standard is defined and published by the Distributed Management Task Force (DMTF). The CIM is an open standard that defines how managed elements in an IT (information technology) environment are represented as a common set of objects and relationships between the objects. This standardization is intended to allow consistent management of the managed elements (including the image processing devices 100, etc.), independent of their manufacturer or provider.

The device information in accordance with the CIM inherits CIM classes C and is managed in a hierarchical manner. In the composition of FIG. 5A, the inheritance relationships from a CIM class C1 to a CIM class C51 are presented and various items of the device information, including the information with respect to device specifications of a printer (which is equivalent to the image processing device 100), the information with respect to execution jobs of the printer, the information with respect to services (installed functions) provided by the printer, etc., are managed as the CIM objects 31.

Specifically, in the composition of FIG. 5A, a CIM class Logical_Element C21 and a CIM class Physical_Element C22 are inherited by the CIM class Managed_System_Element C1. A CIM class Software_Element C31 and a CIM class Enabled_Logical_Element C32 are inherited by the CIM class Logical_Element C21. A CIM class Logical_Device C41, a CIM class Job C42, a CIM class Job_Destination C43, a CIM class Service C44, and a CIM class Service_Access_Point C45 are inherited by the CIM class Enabled_Logical_Element C32. The CIM class Printer C51 is inherited by the CIM class Logical_Device C41. For example, the device information with respect to the specifications of the printer is managed by the CIM manager 123 as effective logical device information among the device information in the image processing device 100 (print system), by using the CIM object 31 which is generated from the CIM class Printer C51.

For example, the CIM manager 123 generates a CIM object 31 from instances of a CIM class C which is described in the format as shown in FIG. 5B.

As shown in FIG. 5B, the CIM class C is composed of a CIM class name CN, a property definition PD, a method definition MD, etc. In the property definition PD, a property name which indicates device information and a data type of the device information (or a data type of a property value) are described. Hence, the property definition PD can be used to define the device information that can be handled. In the method definition MD, a process of data handling of the device information (or a data handling function (method)) is described. Hence, the method definition MD can be used to define the process of data handling of the device information can be defined.

Therefore, the CIM object 31 generated can be used to perform the method and the process of data handling of the device information in response to the request from the CIM manager 123.

Figure 6:
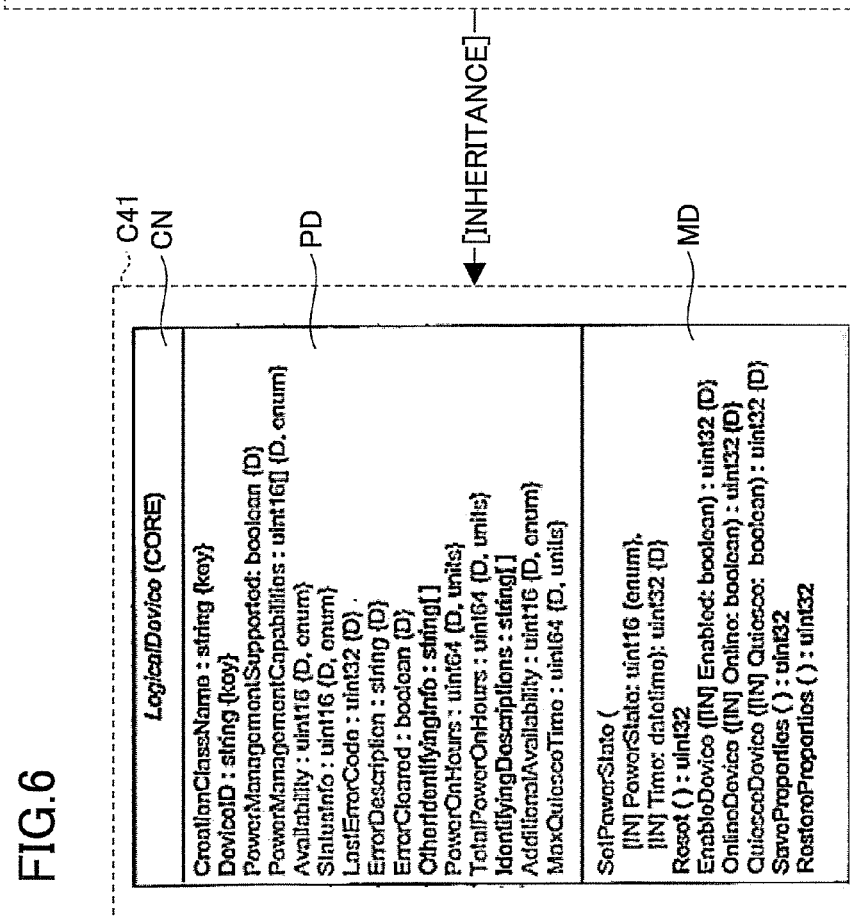
FIG. 6 is a diagram showing a definition of the device information in accordance with the CIM in the image processing device of the present embodiment.

FIG. 6 is a diagram showing a definition of the device information in accordance with the CIM in the image processing device of the present embodiment. A typical example of a definition of the CIM class Logical_Device C41 and the CIM class Printer C51 is shown in FIG. 6.

As shown in FIG. 6, in the CIM class Logical_Device C41, the CIM class name CN identified by "Logical_Device (Core)", the property definition PD indicated by "device ID", "power supply mode", etc., and the method definition MD indicated by the property value storing operation, the deleting operation, etc., are described. Hence, the CIM object 31 generated from the CIM class Logical_Device C41 can be used to perform the data handling of respective property values by execution of the method.

As described above, the CIM class Printer C51 is inherited by the CIM class Logical_Device C41. In the CIM class Printer C51, the CIM class name CN identified by "Printer" and the property definition PD indicated by the device state, the error state, etc., are described.

There is an inheritance relationship between one CIM class C and another CIM class C. The method of the CIM object 31 generated from the inherited CIM class C may be executed to perform the data handling of the property value of the CIM object 31 generated from the original CIM class C. In other words, performance of the data handling by execution of the method may be inherited. For example, the method of the CIM object 31 generated from the CIM class Logical_Device C41 may be executed to perform the data handling of the property value of the CIM object 31 generated from the CIM class Printer C51.

Accordingly, the CIM manager 123 generates the CIM objects 31 from the CIM classes C in which the device information in accordance with the CIM is defined, performs modification, deletion, etc. of the device information by executing the method of one of the CIM objects 31, and manages the device information in accordance with the CIM.

Referring back to FIG. 3, the XML processor 124 is a software part which is provided in the WS-Man handler 12 to perform the analysis of XML data (parser function) and the generation of XML data (generate function). As described above, the XML processor 124 is used when the WS-Man manager 122 analyzes the SOAP message received from the device management apparatus 100 through the Web service 121. The XML processor 124 is used when the WS-Man manager 122 generates the SOAP message to be transmitted to the device management apparatus 100 through the Web service 121. The XML processor 124 includes a kXML 124k corresponding to the kSOAP 121k of the Web service 121, in order to allow the WS-Man manager 122 to generate the SOAP message at this time. The kXML 124k is one of the libraries of the Web service client used in the SOAP communication.

As described above, the device management system 1 of this embodiment is arranged so that the image processing device 100 has the above-described software composition and is able to transmit the device information in accordance with the CIM to the device management apparatus 200 by performing the message exchange operation by the WS-Management. Therefore, the device management system 1 of this embodiment can provide a device management service.

Next, a job management function included in the device management function of the present embodiment will be described.

In the image processing device 100 of the present embodiment, a data handling request of information with respect to jobs included in a query described in a general-purpose language is received. The image processing device 100 transforms each of the CIM objects 31 of the information with respect to the jobs generated in the memory corresponding to the execution jobs, into XML data (a structured document) on a job basis. The image processing device 100 combines the XML data items transformed on a job basis into one item of XML data (the combined XML data). The image processing device 100 executes the query to determine the execution job indicated by the data handling request, in the combined XML data. The image processing device 100 extracts the XML data which defines the information with respect to the determined execution job, from the combined XML data. The image processing device 100 transforms the extracted XML data into the CIM objects 31 on a job basis. The image processing device 100 performs the requested data handling of the CIM objects 31 transformed on a job basis, and transmits the result of the data handling to the requesting source. In this manner, the image processing device 100 can provide the job management function.

As previously described, in the case of the method of managing CIM objects according to the related art, preparation of an extension to the CIMOM is required depending on the content of the data handling request of the information in accordance with the CIM. Moreover, it has been difficult for the method according to the related art to carry out the job management using the device information in accordance with the CIM by execution of a query described in a general-purpose language.

To eliminate the problem, the image processing device 100 of the present embodiment is arranged so that one item of XML data in which the information with respect to jobs is defined is generated from the CIM objects 31 corresponding to execution jobs and execution of a query described in a general-purpose language to include a data handling request is allowed. The image processing device 100 extracts the CIM object 31 of the execution job indicated by the data handling request from among the CIM objects 31 corresponding to the execution jobs, and performs the requested data handling of the extracted CIM object 31.

Accordingly, the image processing device 100 of the present embodiment does not require the preparation of an extension to the CIMOM and can carry out the job management using the device information in accordance with the CIM by execution of a query described in a general-purpose language.

Figure 7:
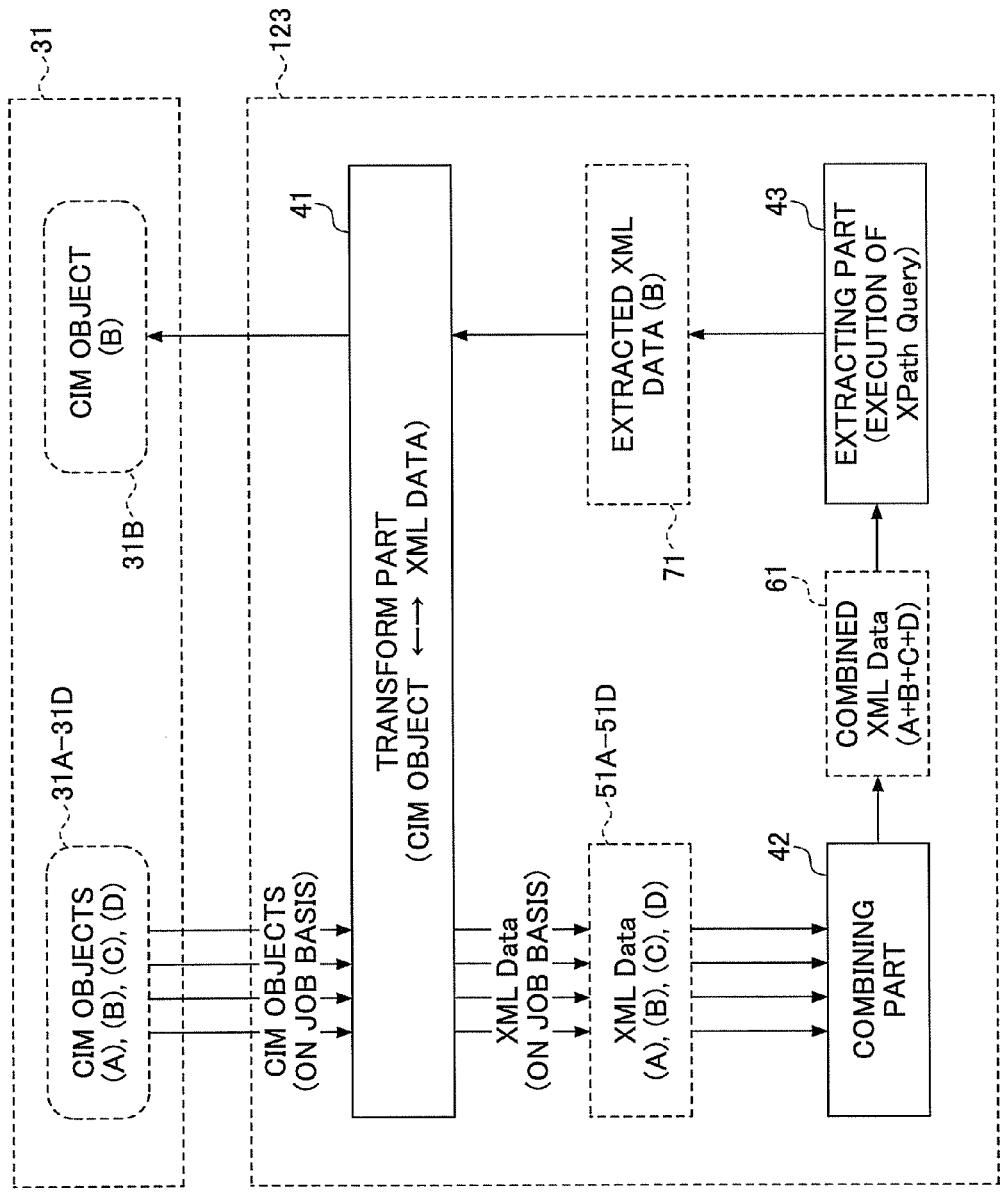
FIG. 7 is a diagram showing the functional composition of the image processing device of the present embodiment.

In the following, the composition and operation of the above-described job management function will be described. FIG. 7 is a diagram showing the functional composition of the image processing device 100 of the present embodiment.

As shown in FIG. 7, the above-described job management function is performed by the CIM manager 123 of the image processing device 100. The CIM manager 123 includes at least a transform part 41, a combining part 41, and an extracting part 43.

The transform part 41 is a software part which is provided in the CIM manager 123 to perform data transformation of a CIM object 31 into an XML data (a structured document) and perform data transformation of the XML data into the CIM object 31.

The transform part 41 transforms each of the generated CIM objects 31 into XML data 51 on a job basis. The transform part 41 transforms the XML data (the extracted XML data) 71 extracted by the extracting part 43, into the CIM object 31 on a job basis.

For example, when four execution jobs (A)-(D) exist on the image processing device 100, the CIM manager 123 generates four CIM objects 31A-31D of the information with respect to jobs corresponding to these execution jobs (A)-(D). Namely, the CIM manager 123 generates a CIM object 31 of the information with respect to each job on a job basis. In this case, the transform part 41 transforms the generated CIM objects 31A-31D into four XML data 51A-51D respectively.

The combining part 42 is a software part which is provided in the CIM manager 123 to combine the plural XML data 51 from the transform part 41 into one item of XML data 61. For example, when the transform part 41 transforms the CIM objects 31A-31D into the XML data 51A-51D respectively, the combining part 41 combines these XML data 51A-51D into one item of XML data 61 (or the combined XML data (A+B+C+D)).

The extracting part 43 is a software part which is provided in the CIM manager 123 to extract the XML data which defines the information with respect to the job indicated by the data handling request, from the combined XML data 61 output from the combining part 41.

The extracting part 43 executes the received query to the combined XML data 61 and determines the execution job indicated by the data handling request from among the execution jobs defined in the combined XML data 61. At this time, the extracting part 43 in the present embodiment executes a query which is described in the XPath to indicate a specific element in the XML data, to the combined XML data 61. The query described in the XPath is an example of a query described in a general-purpose language.

In the image processing device 100, when a query described in a general-purpose language, such as the XPath, is received from a requesting source, a data handling request of the information with respect to jobs, included in the query, is received. In the received query, for example, a search condition (or a search key) for specifying the data handling object is described. Thereby, the extracting part 43 searches the content of the combined XML data 61 and discovers the execution job which meets the condition specified in the query, from the combined XML data 61.

As a result, the extracting part 43 extracts the XML data which defines the information with respect to the discovered execution job, from the combined XML data 61 based on the search result. Hence, the extracting part 43 generates the extracted XML data 71 as described above.

The transform part 41 transforms the extracted XML data 71 generated by the extracting part 43, into a CIM object 31 on a job basis.

For example, when the extracting part 43 generates the extracted XML data 71 which defines the information with respect to the execution job (B), in response to the data handling request, the transform part 41 transforms the extracted XML data 71B into the CIM object 31B corresponding to the execution job (B). In this manner, the transform part 41 performs a first transform process that transforms the generated CIM object 31 into the XML data 51 on a job basis, and performs a second transform process that transforms the extracted XML data 71 into the CIM object 31 on a job basis.

The image processing device 100 extracts the CIM object 31 of the execution job indicated by the data handling request, from among the CIM objects 31 corresponding to the execution jobs, and performs the requested data handling of the extracted CIM object 31.

For example, when a data handling request which is an information acquisition request is received from the device management apparatus 200, the image processing device 100 acquires the property value from the CIM object 31 of the device information indicated by the information acquisition request, and transmits a SOAP message including the acquired property value, to the device management apparatus 200.

As described above, the job management function of the present embodiment is carried out by the software parts which perform the respective operations in an associated manner.

Next, operation of a CIM object searching process included in the job management function performed by the CIM manager 123 of the image processing device 100 of the present embodiment will be described.

Figure 8:
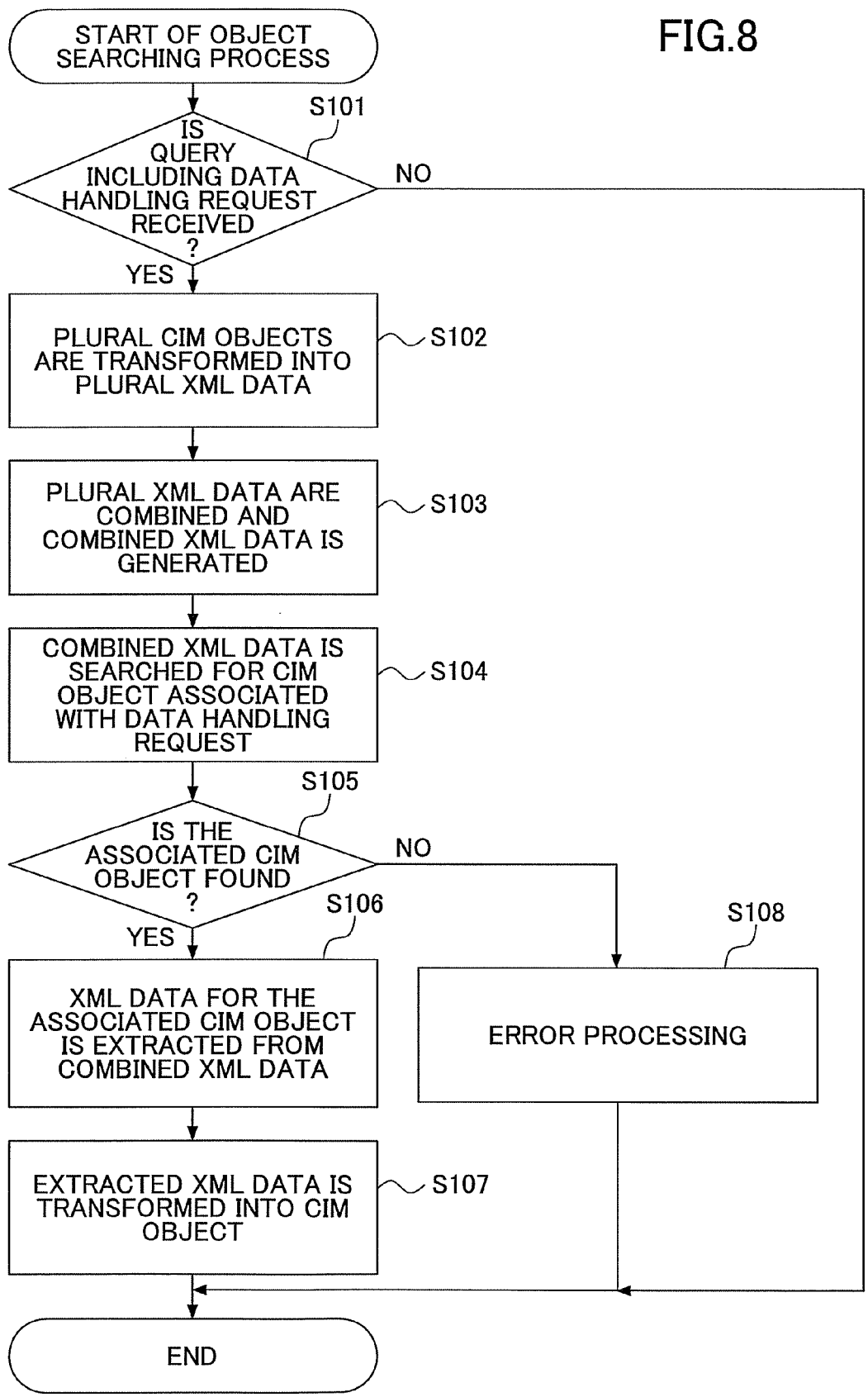
FIG. 8 is a flowchart for explaining an object searching process performed by the image processing device of the present embodiment.
Figure 9:
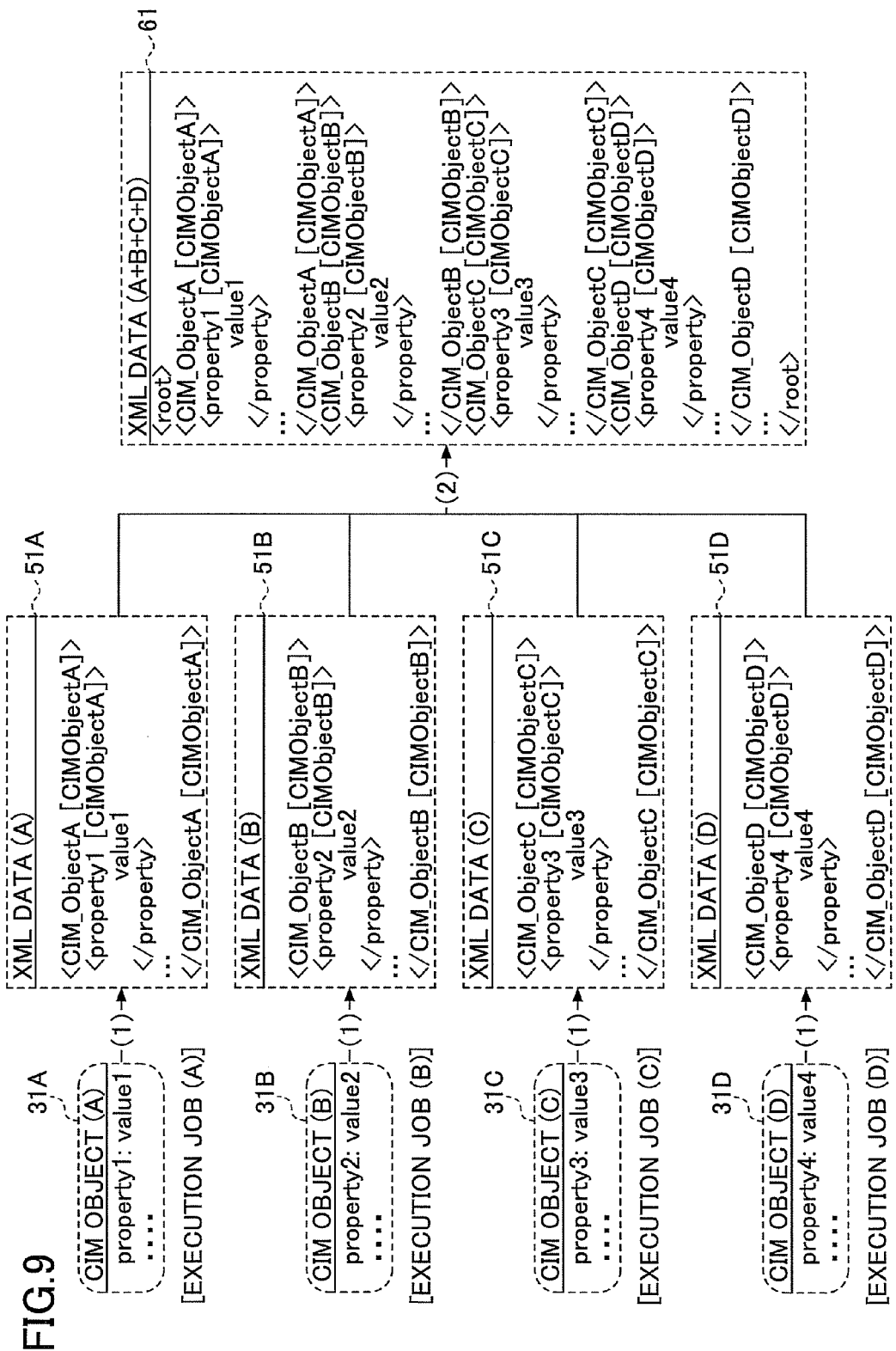
FIG. 9 is a diagram showing an operation of the object searching process performed by the image processing device of the present embodiment.
Figure 10:
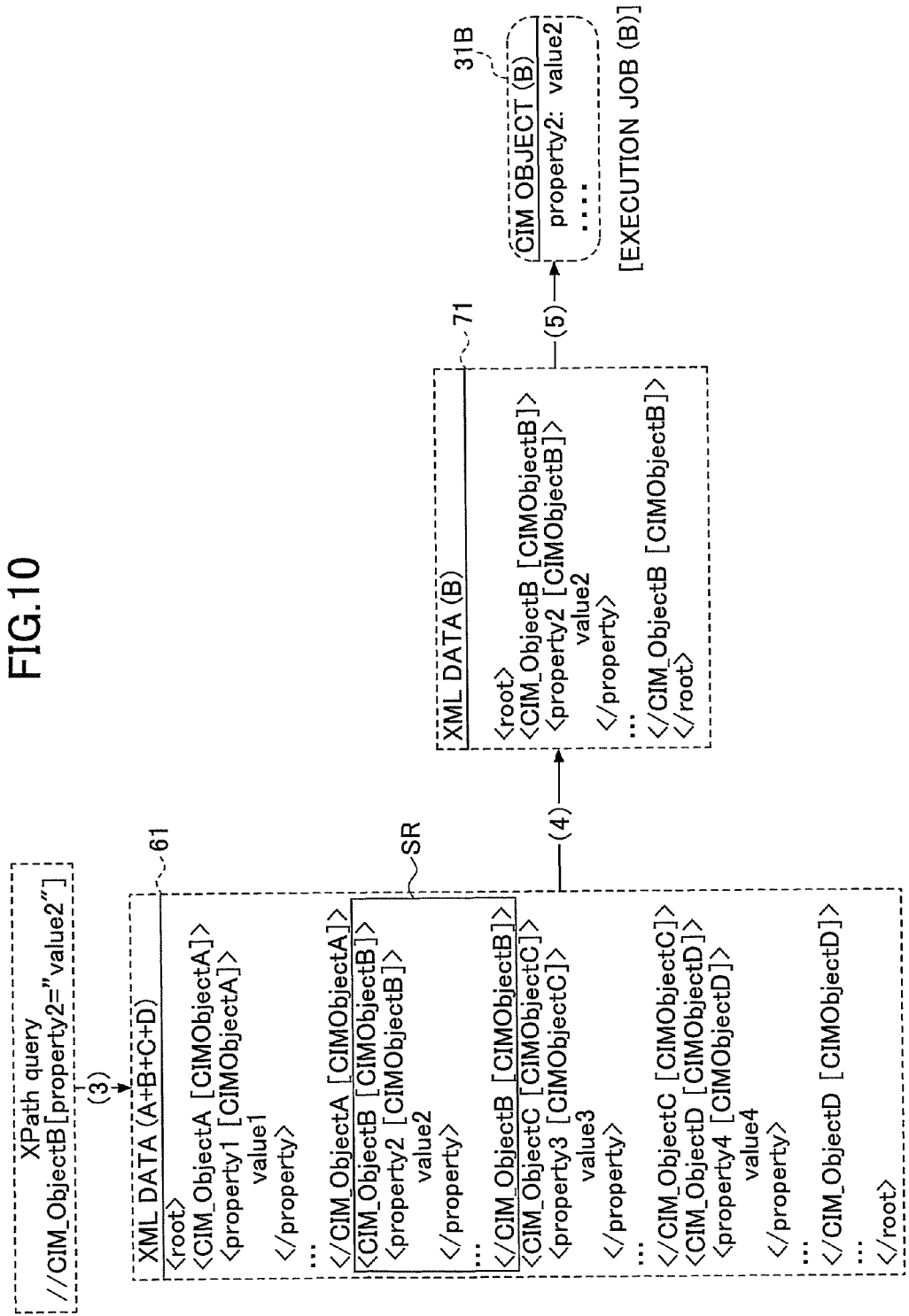
FIG. 10 is a diagram showing an operation of the object searching process performed by the image processing device of the present embodiment.

FIG. 8 is a flowchart for explaining an object searching process performed by the image processing device of the present embodiment. FIG. 9 and FIG. 10 are diagrams showing examples of operations of the object searching process performed by the image processing device of the present embodiment.

In the examples of FIG. 9 and FIG. 10, the data transitions during the object searching process by the CIM manager 123 when four CIM objects 31A-31D corresponding to execution jobs (A)-(D) are generated on the memory unit are illustrated.

Upon start of the object searching process in the flowchart of FIG. 8, the image processing device 100 determines whether a query including a data handling request of the information with respect to execution jobs is received (step S101). For example, the query may include a data handling request which is transmitted to the image processing device 100 by the device management apparatus 200.

When it is determined in step S101 that the query is received, the image processing device 100 causes the transform part 41 of the CIM manager 123 to transform the plural CIM objects 31, corresponding to the execution jobs generated on the memory unit, into XML data 51 respectively (step S102). The processing of step S102 corresponds to the first transform process by the transform part 41.

The data transition indicated by (1) in FIG. 9 corresponds to the processing of step S102. As indicated by (1) in FIG. 9, the four CIM objects 31A-31D are respectively transformed into the four XML data 51A-51D by the transform part 41 at step S102. At this time, the transform part 41 generates each XML data 51 on the memory unit by defining the object identifier or the property value of a corresponding CIM object with predetermined tags (e.g., "<CIM_ObjectX>[XX]", "/<CIM_ObjectX>[XX]", "<propertyX>[XX]", "</property>").

In the flowchart of FIG. 8, the combining part 41 of the CIM manager 123 combines the plural XML data 51 into one item of XML data 61 (step S103).

The data transition indicated by (2) in FIG. 9 corresponds to the processing of step S103. As indicated by (2) in FIG. 9, the four XML data 51A-51D are combined into one item of XML data 61 by the combining part 41 at step S103. At this time, the combining part 41 combines the four XML data 51A-51D by defining the combination data using predetermined tags (e.g., "<root>", "</root>"), and generates one item of XML data (the combined XML data) 61 on the memory unit.

In the flowchart of FIG. 8, the extracting part 43 of the CIM manager 123 searches the content of the combined XML data 61 based on the search key (or the search condition determined as the data handling request) described in the query (step S104).

Execution of the XPath query indicated by (3) in FIG. 10 corresponds to the processing of step S104. At this time, the extracting part 43 executes the query in which the search key for discovering an execution job associated with the data handling request (e.g., "//CIM_ObjectB[property2="value2"]") is described, and discovers the definition data SR of the associated execution job from the combined XML data 61.

In the flowchart of FIG. 8, the extracting part 43 determines whether the CIM object 31 corresponding to the execution job associated with the data handling request is found in the combined XML data 61 (step S105).

When it is determined in step S105 that the associated CIM object 31 is found, the extracting part 43 extracts XML data 71 (or the XML data (B)) corresponding to the associated CIM object 31 from the combined XML data 61 based on the search result (step S106).

The data transition indicated by (4) in FIG. 10 corresponds to the processing of step S106. As indicated by (4) in FIG. 10, the definition data SR which is the information with respect to the execution job (B) defined as being associated with the data handling request in the query is extracted from the combined XML data 61 by the extracting part 43 at step S106.

At this time, the extracting part 43 extracts the definition data SR determined by the search from the combined XML data 61, and generates new XML data (the extracted XML data) 71 on the memory unit.

In the flowchart of FIG. 8, the transform part 41 of the CIM manager 123 transforms the extracted XML data 71 into CIM object 31 on a job basis (step S107). The processing of step S107 corresponds to the second transform process by the transform part 41.

As indicated by (5) in FIG. 10, the extracted XML data 71 is transformed into the CIM object 31B of the execution job (B) by the transform part 41. At this time, the transform part 41 generates the CIM object 31 on the memory unit based on the object identifier or the property value, etc. which are defined as the content of the extracted XML data 71.

In the flowchart of FIG. 8, when it is determined in step S105 that the associated object is not found, the extracting part 43 performs an error processing (step S108). For example, the error processing may include reporting of an error message (which is, for example, displayed on the operation panel 120) indicating that the associated CIM object is not found. For example, the operation panel 120 at this time supplies the user with the error message.

The image processing device 100 of the present embodiment performs the data handling of the requested job management with respect to the CIM object 31 extracted in accordance with the object searching process described above.

As described above, in the image processing device 100 of the present embodiment, the CIM manager 123 performs the following job management function.

The image processing device 100 receives a data handling request of information with respect to jobs included in a query (the XPath query) described in a general-purpose language. The image processing device 100 causes the transform part 41 of the CIM manager 123 to transform a plurality of CIM objects 31 corresponding to the execution jobs into the XML data 51 on a job basis (the first transform process).

The image processing device 100 causes the combining part 41 of the CIM manager 123 to combine the plural XML data 51 transformed on a job basis into one item of XML data 61. The image processing device 100 causes the extracting part 43 of the CIM manager 123 to perform the query to the combined XML data 61, and determines the execution job associated with the data handling request. As a result, the extracting part 43 extracts the XML data 71 which defines the information with respect to the job determined by the search, from the combined XML data 61.

The image processing device 100 causes the transform part 41 of the CIM manager 123 to transform the extracted XML data 71 into the CIM object 31 on a job basis (the second transform process).

In this manner, the image processing device 100 performs the requested data handling of the CIM object 31 and transmits the result of the data handling to the requesting source.

Accordingly, in the image processing device 100 of the present embodiment, the XML data 51 in which the information with respect to execution jobs is defined is generated from the respective CIM objects 31 corresponding to the execution jobs, and a query described in a general-purpose language to include a data handling request can be performed.

In the image processing device 100 of the present embodiment, preparation of an extension to the CIMOM is not needed, and a query described in a general-purpose language can be executed to perform the job management using the device information in accordance with the CIM.

In the above-described embodiment, the job management function of the image processing device 100 is performed by execution of the program which is described in a programming language in conformity with the hardware requirement (platform) by the CPU 111.

The above-described program may be stored in the recording medium 114a which is readable by a computer. Examples of the recording medium 114a may include an SD memory card, a USB memory, etc.

Therefore, the program can be stored in the recording medium 114a, and the program can be installed in the image processing device 100 through the external memory I/F 114 by using the recording medium 114a.

Because the image processing device 100 is provided with the network I/F 113, the above-described program can be downloaded and installed in the image processing device 100 via the network, such as the Internet.

As described in the foregoing, according to the present disclosure, the XML data in which the information with respect to each job is defined from each of a plurality of CIM objects corresponding to a plurality of execution jobs is generated, and the execution of a query described in a general-purpose language is performed. Accordingly, it is possible to provide an image processing device, a device management system, and an image processing method which can perform job management using the device information in accordance with the CIM by execution of a query described in a general-purpose language, without having to prepare the extension to the CIMOM.

The present disclosure is not limited to the specifically disclosed embodiments, and variations and modifications may be made without departing from the scope of the present disclosure.

The present application is based upon and claims the benefit of priority of the prior Japanese patent application No. 2010-057167, filed on Mar. 15, 2010, the contents of which are incorporated herein by reference in their entirety.

What is claimed is:

1. An image processing device which is connected to a device management apparatus via a network, the device management apparatus managing the image processing device based on device information received from the image processing device and described in accordance with the Common Information Model CIM, the image processing device including a processing unit comprising:
a first transform part to transform, when a query described in a general-purpose language to include a request of data handling of device information with respect to jobs is received from a requesting source, CIM objects, generated on a memory unit from the device information with respect to the jobs, into XML data items respectively;
a combining part to combine the XML data items from the first transform part into XML data and generate the combined XML data on the memory unit;
an extracting part to extract at least one XML data item associated with the data handling request from the combined XML data from the combining part; and
a second transform part to transform the XML data item from the extracting part into at least one CIM object,
wherein the image processing device performs data handling including at least one of transforming, combining and extracting of the at least one CIM object and transmits a result of the data handling to the requesting source, and
wherein the extracting part determines whether a CIM object corresponding to the job associated with the data handling request is found in the combined XML data, and wherein the extracting part extracts the XML data corresponding to the CIM object if it is determined that the CIM object is found in the combined XML data, and generates the CIM object based on the extracted XML data.

2. The image processing device according to claim 1, wherein the second transform part is configured to transform the XML data item extracted by the extracting part into only a particular CIM object corresponding to the job associated with the data handling request.

3. A device management system, including:
a device management apparatus, and
one or a plurality of image processing devices connected the device management apparatus via a network, the device management apparatus managing each image processing device in a unified manner based on device information received from the image processing device and described in accordance with the Common Information Model CIM, each image processing device including a processing unit comprising:
a first transform part to transform, when a query described in a general-purpose language to include a request of data handling of device information with respect to jobs is received from the device management apparatus, CIM objects, generated on a memory unit from the device information with respect to the jobs, into XML data items respectively;
a combining part to combine the XML data items from the first transform part into XML data and generate the combined XML data on the memory unit;
an extracting part to extract at least one XML data item associated with the data handling request from the combined XML data from the combining part; and
a second transform part to transform the XML data item from the extracting part into at least one CIM object,
wherein the image processing device performs data handling including at least one of transforming, combining and extracting of the at least one CIM object and transmits a result of the data handling to the device management apparatus, and
wherein the extracting part determines whether a CIM object corresponding to the job associated with the data handling request is found in the combined XML data, and wherein the extracting part extracts the XML data corresponding to the CIM object if it is determined that the CIM object is found in the combined XML data, and generates the CIM object based on the extracted XML data.

4. An image processing method for use in an image processing device which is connected to a device management apparatus via a network, the device management apparatus managing the image processing device based on device information received from the image processing device and described in accordance with the Common Information Model CIM, the image processing device including a processing unit, the image processing method comprising:
transforming, by a first transform part of the processing unit, when a query described in a general-purpose language to include a request of data handling of device information with respect to jobs is received from a requesting source, CIM objects, generated on a memory unit from the device information with respect to the jobs, into XML data items respectively;

combining, by a combining part of the processing unit, the XML data items from the first transform part into XML data to generate the combined XML data on the memory unit;

extracting, by an extracting part of the processing unit, at least one XML data item associated with the data handling request from the combined XML data from the combining part; and transforming, by a second transform part of the processing unit, the XML data item from the extracting part into at least one CIM object, wherein the image processing device performs data handling including at least one of the transforming, the combining and the extracting of the at least one CIM object and transmits a result of the data handling to the requesting source, and wherein the image processing method further comprises:

determining whether a CIM object corresponding to the job associated with the data handling request is found in the combined XML data, and extracting the XML data corresponding to the CIM object if it is determined that the CIM object corresponding to a job associated with the data handling request is found in the combined XML data, and generating the CIM object based on the extracted XML data.

* * * * *